United States Patent
Atkinson et al.

(10) Patent No.: US 7,392,099 B2
(45) Date of Patent: Jun. 24, 2008

(54) SYSTEM AND METHOD FOR POWER MANAGEMENT WHEN AN OPERATING VOLTAGE IS BETWEEN TWO THRESHOLDS

(75) Inventors: Lee W. Atkinson, Houston, TX (US); Barry N. Carroll, The Woodlands, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 560 days.

(21) Appl. No.: 10/734,938

(22) Filed: Dec. 12, 2003

(65) Prior Publication Data

US 2005/0127758 A1   Jun. 16, 2005

(51) Int. Cl.
*G05B 11/01* (2006.01)
*G05B 24/02* (2006.01)

(52) U.S. Cl. .......................................... 700/22; 323/350

(58) Field of Classification Search ............... 700/22, 700/110, 286, 297, 12; 323/350, 351, 319
See application file for complete search history.

(56) References Cited

U.S. PATENT DOCUMENTS

| | | |
|---|---|---|
| 4,670,837 A | 6/1987 | Sheets |
| 5,021,679 A | 6/1991 | Fairbanks et al. |
| 5,153,535 A | 10/1992 | Fairbanks et al. |
| 5,274,827 A | 12/1993 | Haggerty et al. |
| 5,396,635 A * | 3/1995 | Fung ........................... 713/323 |
| 5,442,794 A | 8/1995 | Wisor et al. |
| 5,450,003 A | 9/1995 | Cheon |
| 5,524,249 A | 6/1996 | Suboh |
| 5,526,253 A * | 6/1996 | Duley ........................... 363/59 |
| 5,781,768 A | 7/1998 | Jones |
| 5,799,198 A | 8/1998 | Fung |
| 5,812,860 A | 9/1998 | Horden et al. |
| 5,874,851 A * | 2/1999 | Shiota ........................ 327/537 |
| 5,991,883 A | 11/1999 | Atkinson |
| 6,029,249 A | 2/2000 | Atkinson |
| 6,078,319 A | 6/2000 | Bril et al. |
| 6,233,691 B1 * | 5/2001 | Atkinson ..................... 713/323 |
| 6,584,571 B1 * | 6/2003 | Fung ........................... 713/310 |
| 6,690,652 B1 * | 2/2004 | Sadri ........................... 370/252 |
| 6,845,456 B1 * | 1/2005 | Menezes et al. ............. 713/320 |
| 6,967,522 B2 * | 11/2005 | Chandrakasan et al. ...... 327/534 |
| 7,100,062 B2 * | 8/2006 | Nicholas ..................... 713/323 |
| 2002/0083356 A1 | 6/2002 | Dai |
| 2003/0025689 A1 | 2/2003 | Kim |
| 2004/0225902 A1 * | 11/2004 | Cesare et al. ................ 713/300 |

* cited by examiner

*Primary Examiner*—Thomas K Pham

(57) ABSTRACT

A system comprises power management logic and an electrical load coupled to the power management logic. The electrical load is configurable to operate in accordance with any of a plurality of power states. The power management logic forces the electrical load to operate in a reduced power state if an operating voltage for the system is between two thresholds.

20 Claims, 1 Drawing Sheet

SYSTEM AND METHOD FOR POWER MANAGEMENT WHEN AN OPERATING VOLTAGE IS BETWEEN TWO THRESHOLDS

BACKGROUND

In some situations, an electronic device requires more electrical power than a power source can provide. For example, some airplanes provide electrical outlets at some or all passenger seats to permit a passenger to plug in a portable computer. Such airplane power outlets may be power limited by a circuit breaker or comparable mechanism. In at least some airplanes, the power limit is 75 watts. As such, if a passenger plugs in a portable computer into such an outlet and attempts to operate the computer in a mode that requires more than 75 watts, electrical power will be shut off automatically to that electrical outlet thereby undesirably preventing all use of the passenger's computer.

BRIEF SUMMARY

In at least some embodiments, a system comprises power management logic and an electrical load coupled to the power management logic. The electrical load is configurable to operate in accordance with any of a plurality of power states. The power management logic forces the electrical load to operate in a reduced power state if an operating voltage for the system is between two thresholds.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Figure 1:
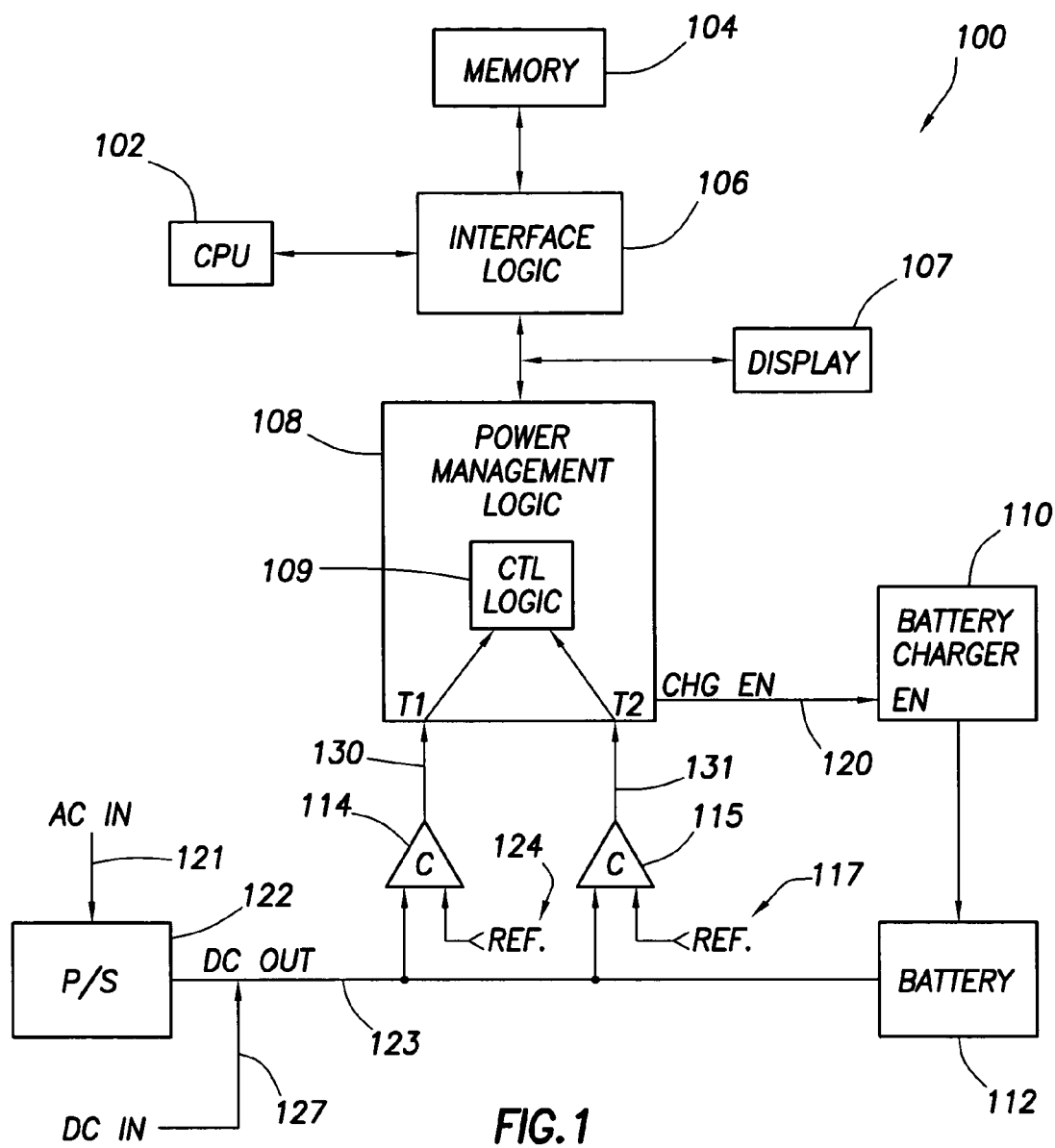
FIG. 1 shows a system implemented in accordance with an exemplary embodiment of the invention.

Referring to FIG. 1, a system 100 comprises a central processing unit ("CPU") 102, memory 104, interface logic 106, a display 107, power management logic 108, a battery charger 110, a rechargeable battery 112, and a power supply 122. Voltage comparators 114 and 115 also are included. The interface logic 106 couples to the CPU 102, memory 104, and power management logic 108 as shown or in accordance with other configurations. The interface logic 106 may comprise a memory controller and bridge functionality and may comprise an off-the-shelf chipset or custom-designed circuitry. In general, the interface logic 106 controls access to memory 104 on behalf of the CPU 102 and other system components.

The system 100 may be representative of a battery-operated portable computer or other type of electronic system. As a battery-operated computer, the computer may receive its operating supply voltage from the battery 112 or from an external source. The external source may comprise a building's supply system, a vehicle cigarette lighter or an outlet on an airplane. The external source provides an alternating current ("AC") input voltage 121 (AC IN) to the power supply 122. The power supply 122 converts the AC IN voltage 121 to a DC output voltage 123 (DC OUT). The DC OUT 123 represents the system's operating voltage. The AC IN voltage 121 may be provided by a power distribution system in a building and thus may be about 110 VAC. In this case, the DC OUT 123 is about 18.5 VDC. The system 100 alternatively receives a direct current ("DC") input voltage 127 (DC IN). For example, the power available at an airplane seat generally comprises a DC voltage of about 15 VDC and thus DC IN 127 and DC OUT 123 in this case is about 15 VDC. The magnitude of the DC OUT 123 is affected by the magnitude of the input source voltage. As will be explained below, the comparators 114, 115 and power management logic 108 function to determine when the system 100 is operating from a power-limited source (e.g., an airplane voltage) and, when such is the case, to force the system into a lower power consumption mode to preclude the system from exceeding the power limit associated with airplanes.

The power management logic 108 may comprise any suitable circuitry such as a MAX 1772 battery charger controller by Maxim Integrated Products coupled to an Intel 8051 microcontroller. In the illustrated embodiment, the power management logic 108 comprises control logic 109 that receives signals 130 and 131 via a T1 threshold input and a T2 threshold input, respectively. As explained below, the signals 130, 131 encode the relationship between the DC OUT 123 operating voltage of the system and the reference voltages 124 and 117. The functionality explained herein as being performed by the power management logic 108 may be attributable in whole, or in part, to the control logic 109. The control logic 109 may be implemented as discrete logic or as processor executing firmware contained within, or otherwise accessible to, the power management logic.

Referring still to FIG. 1, the comparators 114, 115 detect when the DC OUT 123 crosses predetermined thresholds as specified by reference voltages 124 and 117. The output signal 130 from comparator 114 may be asserted high when the DC OUT 123 exceeds the reference 124, otherwise, the output signal 130 may be asserted low. Similarly, the output signal 131 from comparator 115 may be asserted high when the DC OUT 123 exceeds the reference 117, otherwise, the output signal 131 may be asserted low. Comparator 114 thus detects whether the DC OUT 123 exceeds a first threshold (T1) and comparator 115 detects whether the DC OUT 123 exceeds a second threshold (T2). The reference voltages 117 and 124 are selected so as to implement the desired thresholds T1 and T2.

The thresholds T1 and T2 are implemented so as to distinguish a specific voltage, such as voltage available on an airplane from other power-limited sources. As noted above, airplane voltage may be about 15 VDC, while the DC OUT 123 resulting from 110 VAC AC IN may be about 18.5 VDC. In at least one embodiment, threshold T1 may be implemented as 15.5 VDC and T2 may be implemented as 14.5 VDC, although these voltage levels may be varied as desired.

Figure 2:
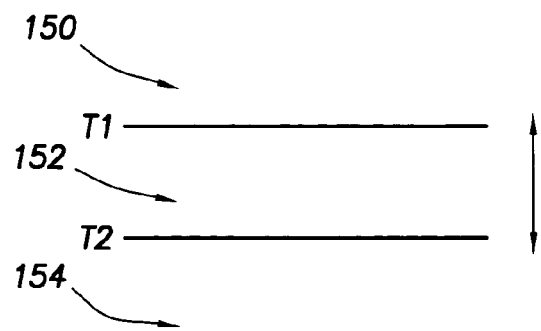
FIG. 2 depicts a relationship between voltage thresholds implemented in the system of FIG. 1.

FIG. 2 graphically illustrates between relationship of thresholds T1 and T2. As shown, thresholds T1 and T2 define three regions 150, 152 and 154. Region 150 comprises DC OUT voltages that exceed the first threshold (e.g., voltages above 15.5 VDC). Region 152 comprises the voltage range between the two thresholds T1 and T2 and region 154 comprises voltages below threshold T2. Referring to FIGS. 1 and 2, the power management logic 108 determines in which of the three regions 150-154 the DC OUT 123 lies based on a comparison of the output signals 130 and 131 from the comparators 114 and 115. Table I below correlates the thresholds T1, T2 to the regions 150-152.

TABLE 1

| Does signal 130 exceed T1? | Does signal 131 exceed T2? | Region |
|---|---|---|
| Yes | Yes | 150 |
| No | Yes | 152 |
| No | No | 154 |

The system's DC OUT 123 operating voltage being in voltage region 152 signifies that the system 100 is operating from a power-limited source and thus the system runs the risk of exceeding the power limit (e.g., 75 watts in the case of airplane power) unless precautions are taken. In accordance with an embodiment of the invention, the power management logic 108 determines when the DC OUT 123 is in region 152 and causes the system to transition, unless already there, to a power state or mode which precludes the system from exceeding the power limit of the source of the DC IN 127. For example, if the source is airplane power limited to 75 watts, the power state in which the system 100 is forced to operate by the power management logic 108 comprises a state that does not require more than 75 watts of power. Any one or more of a variety of power states may be implemented to limit the system's power draw to 75 watts or less. In general, any one or more of a variety of electrical loads in the system 100 may be configured to reduce their power draw. Examples of power-limiting states include slowing down the average clock speed of the CPU 102 (also referred to as "throttling" back the CPU), dimming the display 107, shutting down spinning storage media such as floppy and hard disk drives, etcetera.

The system's DC OUT 123 operating voltage being in voltage region 150 signifies that the system 100 is operating from, for example, 110 VAC power (e.g., from a building's distribution system) in which case power consumption is limited by the size of the applicable circuit breaker or fuse. A 20 amp breaker, for example, limits the power draw to about 2200 watts which is more than enough to power computer system 100 in any power state. Thus, limiting the power draw of the system 100 while operating in region 150 is not a concern and, if desired, the system 100 may be permitted to operate in a full performance mode (e.g., CPU 102 is not throttled back, display 107 is not dimmed and disk drives are permitted to operate normally).

If the system 100 operates from battery power, the voltage output of the battery 112 will decrease over time. At some point in time, the battery's voltage may fall below threshold T2. Thus, voltage region 154 in the present example generally signifies that the system is operating from battery power. The user of the system 100 may desire for the system 100 to transition to a lower performance mode such as that described above to prolong battery power. However, such a power mode is not required and, to the extent permitted by the battery, the system 100 may operate in a full performance mode, while the battery holds sufficient charge, while in region 154.

The system 100 may have a power state that is programmable via a suitable software interface such as an operating system (not specifically shown) executing on the system's CPU 102. Any one of a variety of power states may be selected by a user. Different states may require the system to draw more power than other states. While the DC OUT 123 is in region 152, however, the power state of the system 100 is forced (i.e., is not programmable otherwise) to a state that does not require more than a predetermined amount of power compatible with the known or anticipated power limit of the external power source (e.g., airplane seat power). Otherwise, while the system's DC OUT 123 is in the other two regions 150 and 154, the power state is programmable and thus can be whatever the user desires.

As shown in FIG. 1, the DC OUT 123 may charge the battery 112 under control of the battery charger 110. The power management logic 108 is adapted to assert a charge enable ("CHG EN") signal 120 to the battery charger 110 to enable or disable battery charging. If the power management logic 108 determines that the DC OUT 123 is in region 152, meaning that the system 100 is operating from a power limited airplane seat source, the power management logic asserts the CHG EN signal 120 to a state to cause the battery charger 110 to disable battery charging. Disabling battery charging may be helpful to ensure that the system's power draw is maintained below the limit associated with the airplane's specification.

What is claimed is:

1. A system, comprising:
   power management logic;
   an electrical load coupled to the power management logic and configurable to operate in accordance with any of a plurality of power states;
   wherein, if an operating voltage for the system is between two thresholds, the power management logic forces the electrical load to operate in a reduced power state; and
   wherein said electrical load comprises at least one of a CPU, a display, and memory;
   wherein the operating voltage is an output voltage of a power supply and is at a first voltage level it the system is connected to an external source of alternating current (AC) power and is at a second voltage level it the system is connected to an external source of direct current (DC) power.

2. The system of claim 1 further comprising a pair of comparators coupling the operating voltage to inputs of the power management logic, each comparator having a reference voltage different from each other.

3. The system of claim 2 wherein a first of the two thresholds is about 15.5 VDC and the other threshold is about 14.5 VDC.

4. The system of claim 2 wherein the power management logic determines whether the operating voltage is between the reference voltages.

5. The system of claim 1 wherein the system comprises a computer.

6. The system of claim 1 wherein the CPU is coupled to the power management logic and the reduced power state comprises a reduced average clock frequency of a CPU clock.

7. The system of claim 1 wherein the reduced power state comprises a dimmed display.

8. The system of claim 1 wherein if the power management logic determines the operating voltage is above both of the two thresholds, the power management logic permits the system to operate in a full performance power state.

9. The system of claim 1 wherein if the power management logic determines the operating voltage is above both of the two thresholds, the power management logic permits the system to operate in any one of a plurality of power states.

10. The system of claim 9 wherein the power states are programmable.

11. The system of claim 8 wherein if the power management logic determines the operating voltage is below both of the two thresholds, the power management logic causes the system to operate in any one of a plurality of power states.

12. A system, comprising:
an electrical load configurable to operate in accordance with any of a plurality of power states; and
power management means coupled to the load for forcing the system to operate in a reduced power state when an operating voltage for the electrical load is between two voltage levels, said operating voltage being an output voltage of a power supply and said operating voltage is at a first voltage level if the system is connected to an external source of alternating current (AC) power and is at a second voltage level if the system is connected to an external source of direct current (DC) power.

13. The system of claim 12 further comprising means for permitting the system to operate in any one of a plurality of power states when the operating voltage is not between the two voltage levels.

14. The system of claim 12 wherein the means for forcing the system to operate in the reduced power state comprises means for reducing a clock frequency associated with a CPU in the system.

15. The system of claim 12 further comprising means for determining whether the operating voltage is between the two voltage levels.

16. A power management logic unit configured to operate in a system, comprising:
control logic that receives first and second signals, determines whether an operating voltage for a load is between first and second reference voltages based on the first and second signals and, if so, causes the system to operate in a non-programmable, reduced performance mode;
wherein said operating voltage is an output voltage of a power supply and said operating voltage is at a first voltage level if the system is connected to an external source of alternating current (AC) power and is at a second voltage level if the system is connected to an external source of direct current (DC) power.

17. The power management logic unit of claim 16 wherein the control logic determines whether the operating voltage is not between the first and second reference voltages and, if so, permits the system to operate in a mode that requires more power than the reduced performance mode.

18. A method, comprising:
comparing an operating voltage for a load to a first reference voltage and to a second reference voltage; and
when the operating voltage is between the two reference voltages, requiring a system to operate in a less than full performance mode;
wherein the operating voltage is an output voltage of a power supply and is at a first voltage level if the system is connected to an external source of alternating current (AC) power and is at a second voltage level if the system is connected to an external source of direct current (DC) power.

19. The method of claim 18 wherein the reference voltages comprise a first reference voltage and a second reference voltage and the first reference voltage is higher than the second reference voltage, and the method further comprises permitting the system to operate in a full performance mode when operating voltage is above the first reference voltage or below the second reference voltage.

20. The method of claim 18 wherein the reference voltages comprise a first reference voltage and a second reference voltage and the first reference voltage is higher than the second reference voltage, and the method further comprises permitting the system to operate in any one of a plurality of programmable modes only if the operating voltage is above the first reference voltage or below the second reference voltage.

* * * * *

UNITED STATES PATENT AND TRADEMARK OFFICE
CERTIFICATE OF CORRECTION

| | | |
|---|---|---|
| PATENT NO. | : 7,392,099 B2 | Page 1 of 1 |
| APPLICATION NO. | : 10/734938 | |
| DATED | : June 24, 2008 | |
| INVENTOR(S) | : Lee W. Atkinson et al. | |

It is certified that error appears in the above-identified patent and that said Letters Patent is hereby corrected as shown below:

In column 4, line 40, in Claim 1, after "level" delete "it" and insert -- if --, therefor.

In column 4, line 42, in Claim 1, after "level" delete "it" and insert -- if --, therefor.

Signed and Sealed this

Seventeenth Day of March, 2009

JOHN DOLL
*Acting Director of the United States Patent and Trademark Office*